United States Patent [19]

Bennett et al.

[11] 4,380,178

[45] Apr. 19, 1983

[54] REMOTE CONTROL ASSEMBLY (SWIVEL INSERT)

[75] Inventors: William G. Bennett, Troy; Arthur L. Spease, Livonia, both of Mich.

[73] Assignee: Teleflex Incorporated, Limerick, Pa.

[21] Appl. No.: 170,888

[22] Filed: Jul. 21, 1980

[51] Int. Cl.³ .................................................. F16C 1/10
[52] U.S. Cl. ................................... 74/501 P; 403/122; 403/197
[58] Field of Search .................. 74/501 R, 501 P, 502; 403/131, 122, 197

[56] References Cited

U.S. PATENT DOCUMENTS

| | | | |
|---|---|---|---|
| 3,013,443 | 12/1961 | Morse | 74/501 P |
| 3,395,551 | 8/1968 | Morse | 74/501 P |
| 3,994,185 | 11/1976 | Gilari | 74/501 P |
| 4,304,149 | 12/1981 | Heimann | 74/501 R |

*Primary Examiner*—Kenneth Dorner
*Attorney, Agent, or Firm*—Harold W. Milton, Jr.

[57] ABSTRACT

A motion transmitting remote control assembly of the type for transmitting motion in a curved path including a flexible motion transmitting core element, a conduit for supporting the core element and an end fitting disposed at the end of the conduit. A rod is attached to the end of the core element. The assembly also includes a swivel tube having a bore therethrough for swivelling movement relative to the end fitting and for movably supporting the rod. The swivel tube is connected to the end fitting in a swivel joint. The assembly is characterized by the swivel joint including a male swivel portion of the swivel tube and including a cup-shaped insert engaging the male swivel portion at least beyond the front face thereof. The end fitting encapsulates the end of the conduit and the insert and the remainder of the male swivel portion on the swivel tube. A method of making the motion transmitting remote control assembly is also disclosed. The method includes the steps of plugging the bore of the swivel tube contiguous with the passageway of the cup-shaped insert with the cup-shaped insert engaging the male swivel portion to prevent entry of material into the bore of the swivel tube past the front face thereof, placing the swivel tube into a mold cavity, and injecting organic polymeric material into the cavity for molding the fitting about the male swivel portion and the cup-shaped insert.

6 Claims, 2 Drawing Figures

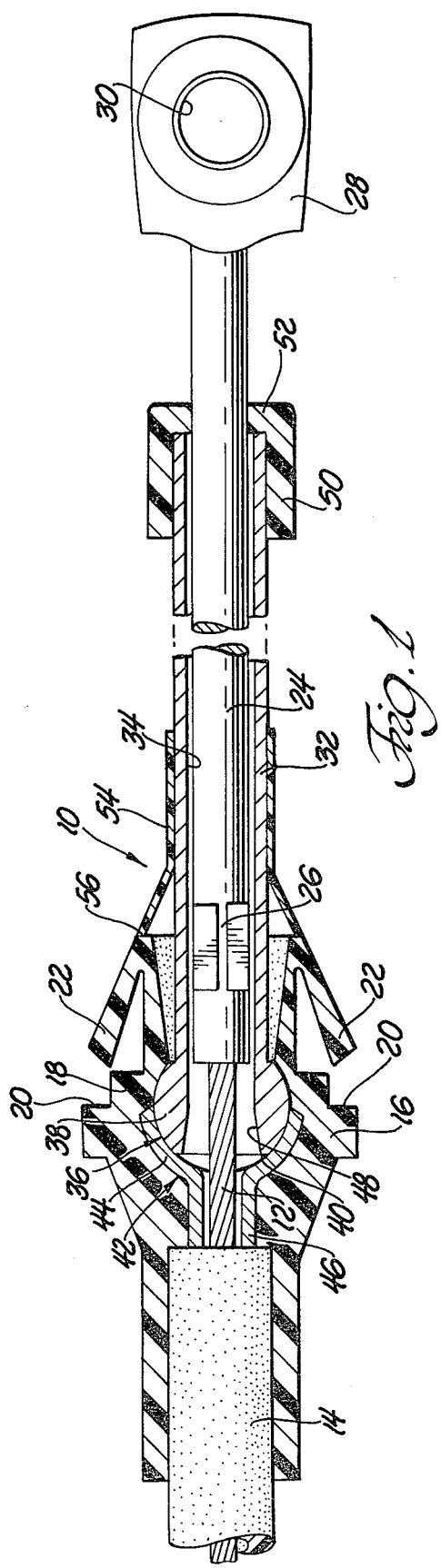
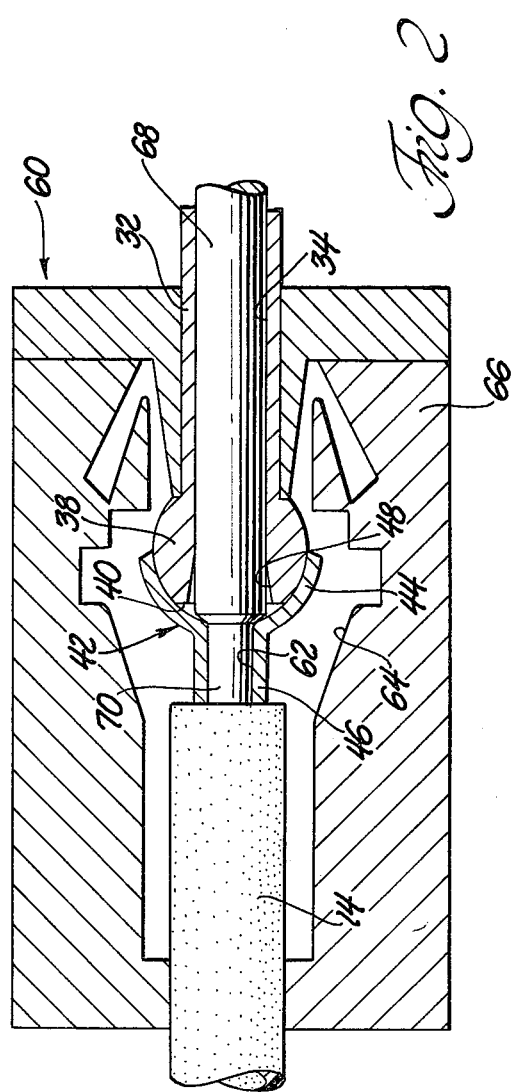

REMOTE CONTROL ASSEMBLY (SWIVEL INSERT)

BACKGROUND OF THE INVENTION (1) Field of the Invention

The subject invention relates to a motion transmitting remote control assembly of the type for transmitting motion in a curved path by a flexible motion transmitting core element.

(2) Description of the Prior Art

The prior art includes various motion transmitting push-pull assemblies including a conduit supported by an end fitting. Generally, a swivel tube or sleeve can be secured to the end fitting at a swivel joint for supporting a rod therein. Various problems have been encountered with these assembles. A major problem has been the construction of the swivel joint wherein bind occurs between the core element and the swivel tube. Other problems have been encountered during the injection mold process wherein a mandrel is generally used to plug the bore of the swivel tube and conduit during the mold process. Frequently, injection pressure forces the conduit from the end of the swivel tube resulting in flash around the opening thereof. The flash is expensive to remove and results in bind of the slidable core element when the swivel tube is pivotted through its design limits.

The instant invention provides a solution to the above problem by including a cup-shaped insert which engages the male portion of the swivel tube so as to prevent plastic melt from entering the aperture of the swivel tube during the molding process.

SUMMARY OF THE INVENTION

The instant invention provides a motion transmitting remote control assembly of the type for transmitting motion in a curved path by a flexible motion transmitting core element. The assembly includes a flexible motion transmitting core element, a conduit for supporting the core element and an end fitting disposed at the end of the conduit. The core element extends from the conduit and a rod is attached to the end of the core element. The assembly further includes a swivel tube having a bore therethrough for swivelling movement relative to the end fitting and movably supporting the rod. The swivel tube is connected to the end fitting at a swivel joint. The assembly is characterized by the swivel joint including a male swivel portion of the swivel tube having a partially convex circular surface extending from its intersection with the exterior of the swivel tube to the front end face of the swivel tube. The swivel joint also includes a cup-shaped insert engaging the convex spherical surface at least beyond the front end face. The end fitting encapsulates the end of the conduit and the insert and the remainder of the convex circular surface of the swivel tube.

A method of making the motion transmitting remote control assembly is also disclosed and includes the steps of plugging the bore of the swivel tube contiguous with the passageway of the tubular portion of the cup-shaped insert with the cup-shaped portion engaging the surface of the male swivel portion to prevent entry of material into the bore past the front end face thereof. The swivel tube is placed into a mold cavity and an organic polymeric material is injected into the cavity for molding the fitting about the male swivel portion.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a longitudinal view partially in cross section showing a preferred embodiment of the motion transmitting remote control assembly of the subject invention; and FIG. 2 is a cross-sectional view showing a mold assembly for making the preferred embodiment of the motion transmitting remote control assembly.

DESCRIPTION OF PREFERRED EMBODIMENT

A motion transmitting remote control assembly of the type for transmitting motion in a curved path by a flexible motion transmitting core element constructed in accordance with the instant invention is generally shown at 10 in FIG. 1. The assembly 10 includes a flexible motion transmitting core element 12 in the form of a cable and a flexible conduit 14 for supporting the core element 12. The conduit may be of the type well known in the art including a plastic inner tube surrounded by a plurality of helically disposed long lay wires surrounded by a plastic outer casing. An end fitting 16 is disposed at the end of the conduit 14.

The end fitting 16 is adapted to support the assembly 10 through an aperture of a support structure. The end fitting includes a body portion 18 and an abutment portion 20 for abutting the support structure at one extremity of the aperture therein to prevent the end fitting 16 from moving through the aperture. The end fitting 16 also includes a pair of flexible legs 22 extending towards the abutment 20 in a cantilevered fashion from the body portion 18 and spaced from the abutment 20 for moving through the aperture as the end fitting 16 is inserted therein and for engaging the end fitting 16 at the other extremity of the aperture for retaining the end fitting 16 therein.

A rod 24 is attached to the end of the core element 12 at 26. Conventional means of attachment can be used, e.g., inserting the core element into the rod and swaging the rod down about the core element.

The rod 24 includes an end portion 28 having a hole 30 therethrough adapted for attachment to a lever. The lever may actuate the core element of the push-pull assembly or the core element may actuate the lever.

The assembly 10 further includes a swivel tube 32 having a bore 34 therethrough for swivelling movement relative to the end fitting 16. The swivel tube 32 movably supports the rod 24 within the bore 34. The swivel tube 32 is connected to the end fitting 16 at a swivel joint generally indicated at 36. The swivel joint 36 allows for the end portion 28 of the rod 24 to be secured to a pivotally moving lever.

The assembly 10 is characterized by the swivel joint 36 including a male swivel portion 38 having a partially convex spherical surface extending from its intersection with the exterior of the swivel tube 32 to the front end face 40 of the swivel tube 32. The swivel joint 36 also includes a cup-shaped insert generally indicated at 42 engaging the convex spherical surface of the male swivel portion 38 at least beyond the front end face 40. The insert 42 includes a cup-shaped portion 44 partially defining the female swivel portion of the swivel joint 36 and an integral tubular portion 46. The integral tubular portion 46 engages the end of the conduit 14. The end fitting 16 encapsulates the end of the conduit 14 and the insert 42 and the remainder of the convex spherical surface of the male swivel portion 38 on the swivel tube 32.

The end fitting 16 and the swivel tube 32 are made of an organic polymeric material. The insert 42 is made of organic polymeric material and can alternatively be made from an appropriate metallic material. As previously stated, the cup-shaped portion 44 of the insert 42 defines a portion of the female swivel portion of the swivel joint 36. Thus, the insert can be made of an appropriate material to provide a desired low friction surface for engaging the male portion 38 of the swivel tube 32.

The bore 34 of the swivel tube 32 includes a frustoconical end portion 48 tapering from a large diameter in a direction away from the front end face 40 to the smaller diameter of the bore 34. The frustoconical end portion 48 eliminates bind on the slidable core element 12 when the swivel tube 32 is pivotted through the design limits.

A wiper cap 50 is attached to the distal end of the swivel tube 34 and is in sliding engagement with the rod 24. The wiper cap 50 includes a lip 52 abutting the distal end of the swivel tube 32 for preventing foreign substances from entering the end of the swivel tube 32 which would inhibit movement of the rod 24 within the bore 34 of the swivel tube 32. A rubber-like boot 54 is frictionally held in place about the swivel tube 32. The boot 54 abuts the end portion 56 of the end fitting 16 for preventing foreign substances from entering the swivel joint 36.

A method of making the motion transmitting remote control assembly 10 is generally shown at 60 in FIG. 2. The method includes the steps of plugging the bore 34 of the swivel tube 32 contiguous with the passageway 62 of the tubular portion 46 of the cup-shaped insert generally indicated at 42. The cup-shaped portion 44 of the cup-shaped insert 42 engages the convex surface of the male swivel portion 38 to prevent entry of material into the bore 34 past the front end face 40 thereof. The swivel tube 32 is placed into a mold cavity 64 of a mold 66. The end of the conduit 14 is placed into the cavity 64 so that the end of the conduit 14 abuts the end of the tubular portion 46 of the insert 42. The end of the conduit 14 is plugged before injecting the organic polymeric material into the cavity 64 to mold the end fitting 16 about the end of the conduit 14 and the insert 42 and the exposed portion of the male swivel portion 38 of the swivel tube 32.

A mandrel 68 with a nose 70 can be inserted into the bore 34 of the swivel tube 32 to fill and plug the smaller diameter portion of the bore 34. The nose 70 fills the passageway 62 of the tubular portion 46 of the insert 42 and also extends into and fills the end of the conduit 14.

The mandrel 68 cannot include an outwardly tapered portion for filling the frustoconical portion 48 of the swivel tube 32 in the absence of the insert 42 because it would then be impossible to remove the mandrel 68 once the fitting 16 is molded about the assembly 10. Furthermore, as previously stated, other problems arise during injection molding when a straight mandrel is used to plug the straight bore of a swivel tube such that the end portion of the mandrel is forced away from the front face of the swivel tube during the injection molding process resulting in a flash around the opening of the bore of the swivel tube. The cup-shaped insert 42 engages the male swivel portion 38 beyond the front end face 40 thereof so as to prevent the injected organic polymeric material from entering the bore 34 of the swivel tube 32. Therefore, there is no flash around the opening of the bore 34 of the swivel tube 32. Also, a straight mandrel 68 can be used in the situation where the swivel tube 32 includes a frustoconical end portion 48. Therefore, the instant invention provides a means for molding an end fitting about the male portion of a swivel tube having a frustoconical bore for allowing the core element to move therewithin and eliminating bind on the core element when the swivel tube is pivotted through the design limits.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assembly (10) of the type for transmitting motion in a curved path by a flexible motion transmitting core element (12), said assembly (10) comprising a flexible motion transmitting core element (12) having a terminal portion, a conduit (14) for supporting said core element (12), said conduit having an end portion, an end fitting (16) disposed about said end portion of said conduit, (14) a rod (24) attached to said terminal portion of said core element, (12) a swivel tube (32) having a bore (34) therethrough for swivelling movement relative to said end fitting (16) and movably supporting said rod (24), said swivel tube (32) connected to said end fitting (16) at a swivel joint (36) and having a front end face (40) and characterized by said swivel joint (36) including a male swivel portion (38) having a partially convex spherical surface extending from its intersection with the exterior of said swivel tube (32) to said front end face (40) of said swivel tube (32) and including a cup-shaped insert (42) engaging said convex spherical surface at least beyond said front end face (40), said end fitting (16) encapsulating said end portion of said conduit (14) and said insert (42) and the remainder of said convex spherical surface on said swivel tube (32).

2. An assembly as set forth in claim 1 wherein said bore (34) in said swivel tube (32) includes a frustoconical end portion (48) tapering from a large diameter in a direction away from said front end face (40) to a smaller diameter.

3. An assembly as set forth in claim 2 wherein said insert (42) includes an integral tubular portion (46) engaging the end of said conduit (14).

4. An assembly as set forth in claim 3 wherein said end fitting (16) and said swivel tube (32) are made of organic polymeric material.

5. An assembly as set forth in claim 4 wherein said insert (42) is made of organic polymeric material.

6. A motion transmitting remote control assembly (10) of the type for transmitting motion in a curved path by a flexible motion transmitting core element (12), said assembly comprising; a flexible motion transmitting core element (12), guide means for guiding said core element (12), a swivel tube (32) for swivelling movement relative to said guide means and having a front end face (40), said swivel tube (32) connected to said guide means at a swivel joint (36) and characterized by said swivel joint (36) including a male swivel portion (38) having a partially convex spherical surface extending from its intersection with the exterior of said swivel tube (32) to the front end face (40) of said swivel tube (32) and including a cup-shaped insert (42) engaging said convex spherical surface at least beyond said front end face (40), said guide means (16) encapsulating said insert (42) and engaging the remainder of said convex spherical surface of said swivel tube (32), so that said male swivel portion is in swiveling engagement with and retained between said insert and said guide means.

* * * * *